(No Model.) 4 Sheets—Sheet 1.

G. VON PRITTWITZ PALM.
MIRROR MAZE.

No. 507,159. Patented Oct. 24, 1893.

Witnesses:
Harry D. Rohrer
A. M. Parkins

Inventor:
Gustav von P. Palm,
By Leunie & Goldsborough
Attys.

(No Model.) 4 Sheets—Sheet 2.

G. VON PRITTWITZ PALM.
MIRROR MAZE.

No. 507,159. Patented Oct. 24, 1893.

(No Model.) 4 Sheets—Sheet 3.
G. VON PRITTWITZ PALM.
MIRROR MAZE.
No. 507,159. Patented Oct. 24, 1893.
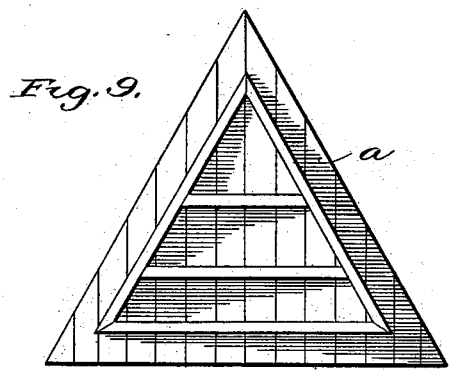
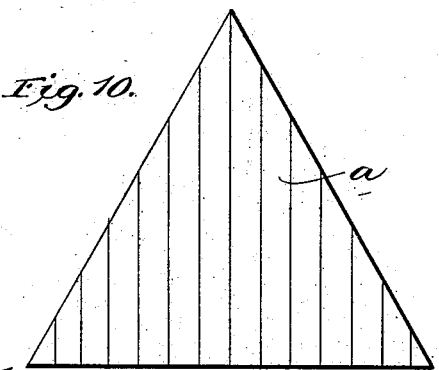
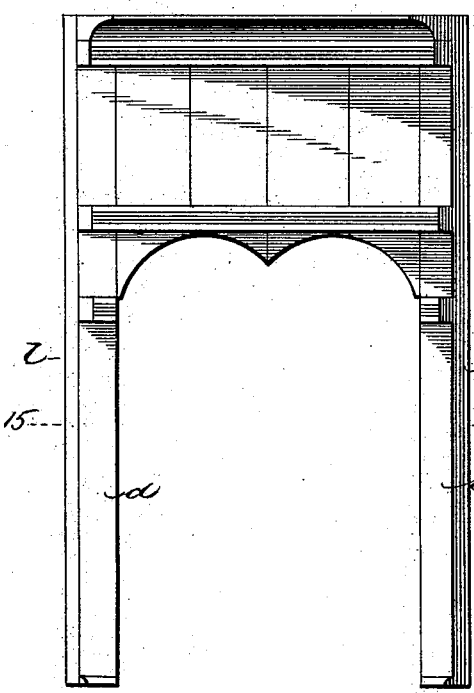
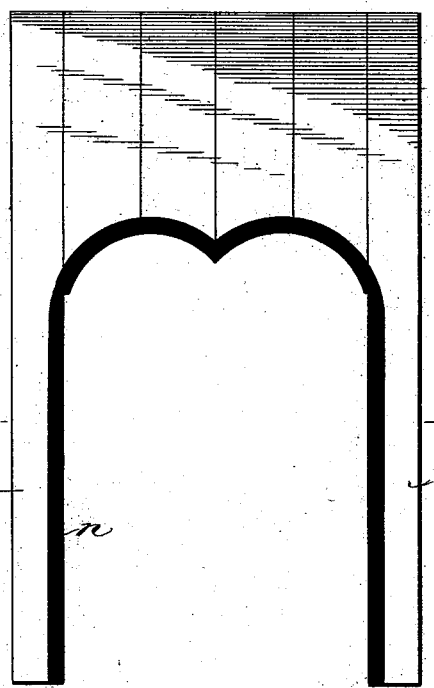
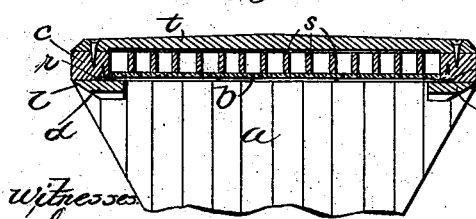
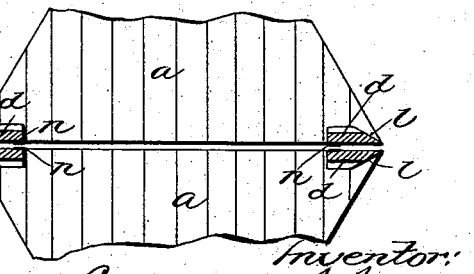

(No Model.)  
4 Sheets—Sheet 4.

G. VON PRITTWITZ PALM.
MIRROR MAZE.

No. 507,159. Patented Oct. 24, 1893.

Witnesses:
Harry D. Rohrer.
A. M. Parkins.

Inventor:
Gustav von P. Palm,
By
Leavitt & Goldsborough
Attys.

UNITED STATES PATENT OFFICE.

GUSTAV VON PRITTWITZ PALM, OF NEW YORK, N. Y.

MIRROR MAZE.

SPECIFICATION forming part of Letters Patent No. 507,159, dated October 24, 1893.

Application filed September 6, 1893. Serial No. 484,900. (No model.)

*To all whom it may concern:*

Be it known that I, GUSTAV VON PRITTWITZ PALM, a subject of the Emperor of Austria-Hungary, residing at New York, in the county of New York and State of New York, have invented certain new and useful Improvements in Mirror Mazes; and I do hereby declare the following to be a full, clear, and exact description of the invention, such as will enable others skilled in the art to which it pertains to make and use the same.

My invention relates to certain new and useful improvements in labyrinths or mazes, wherein by reflection and counter-reflection from a series of mirrors arranged at angles to each other within a suitable room or chamber the effect of a labyrinthian device is obtained,—the optical illusion being heightened by the presence of open arches of external appearance similar to that of the frames within which the mirrors are set. A device of this general character is claimed by me broadly in an application for Letters Patent filed by me December 17, 1892, Serial No. 455,500, and a modified construction thereof is shown in Letters Patent No. 498,524, granted to me May 30, 1893.

The purpose of my invention is to supply certain additional features of improvement to render the illusion produced in these mirror mazes more complete and deceptive so as to increase the difficulty of distinguishing the open arches from those which contain the mirrors or in some instances the transparent glass.

A further object of my invention is to provide means for protecting the mirrors or transparent glasses from breakage when a person walking within the maze collides with them; and my invention further consists in certain details of construction and organization of parts whereby the maze is rendered readily portable and with interchangeable parts so constructed and arranged as to be readily put together to form the completed maze and as readily taken apart for transport or storage.

Figure 1:
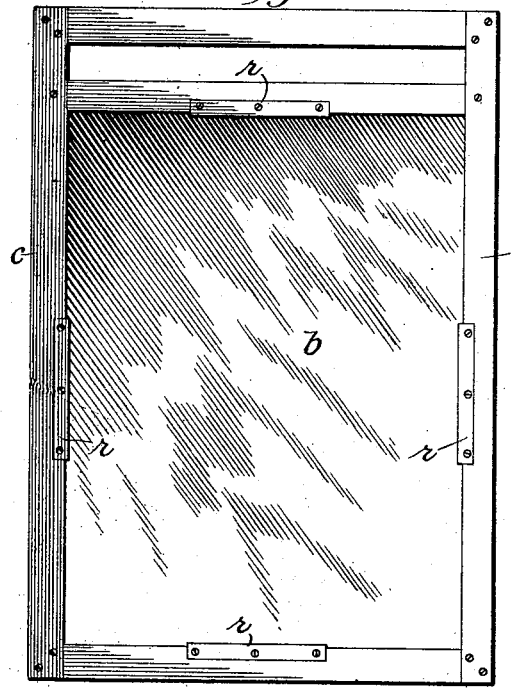
Figure 2:
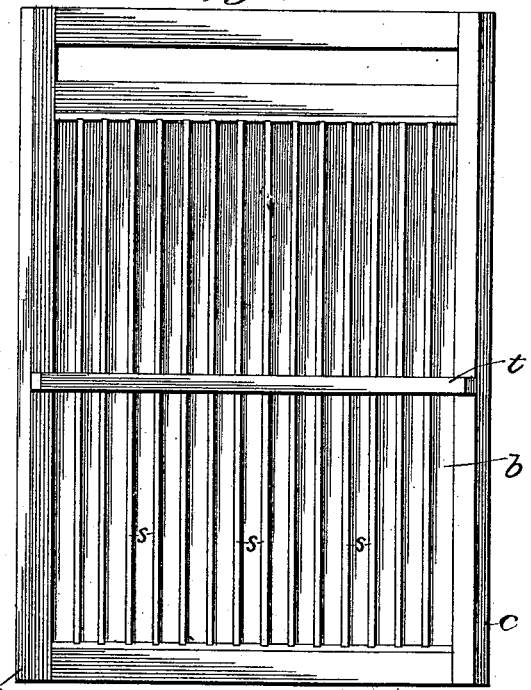
Figure 3:
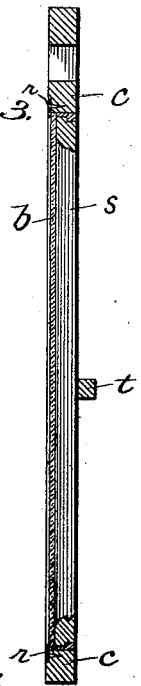
Figure 4:
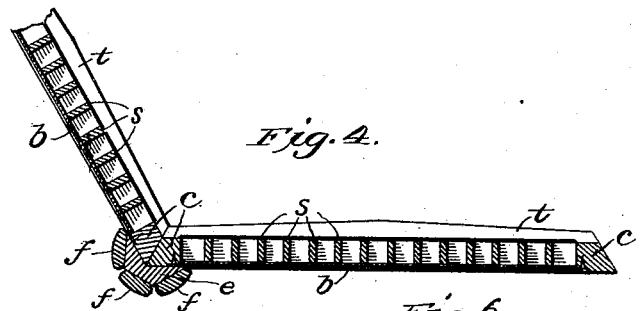
Figure 5:
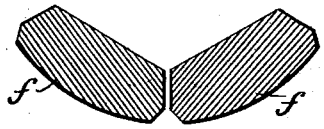
Figure 6:
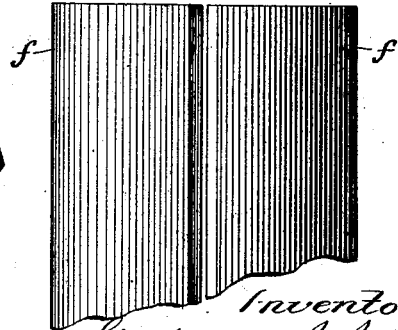
Figure 7:
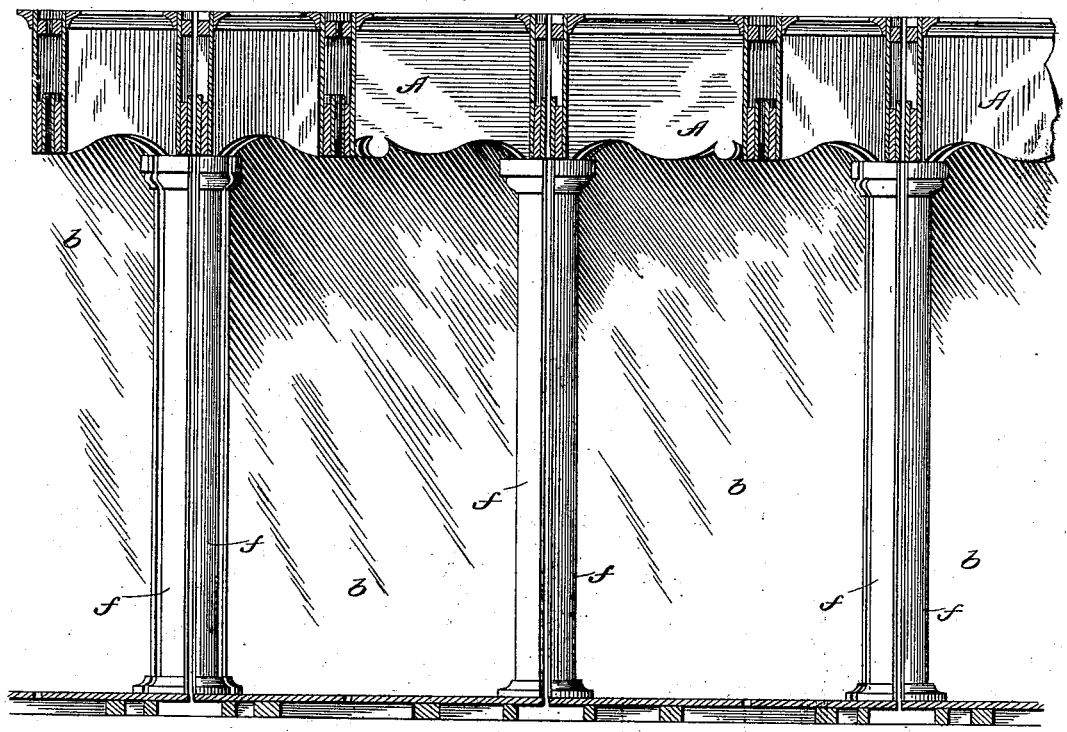
Figure 8:
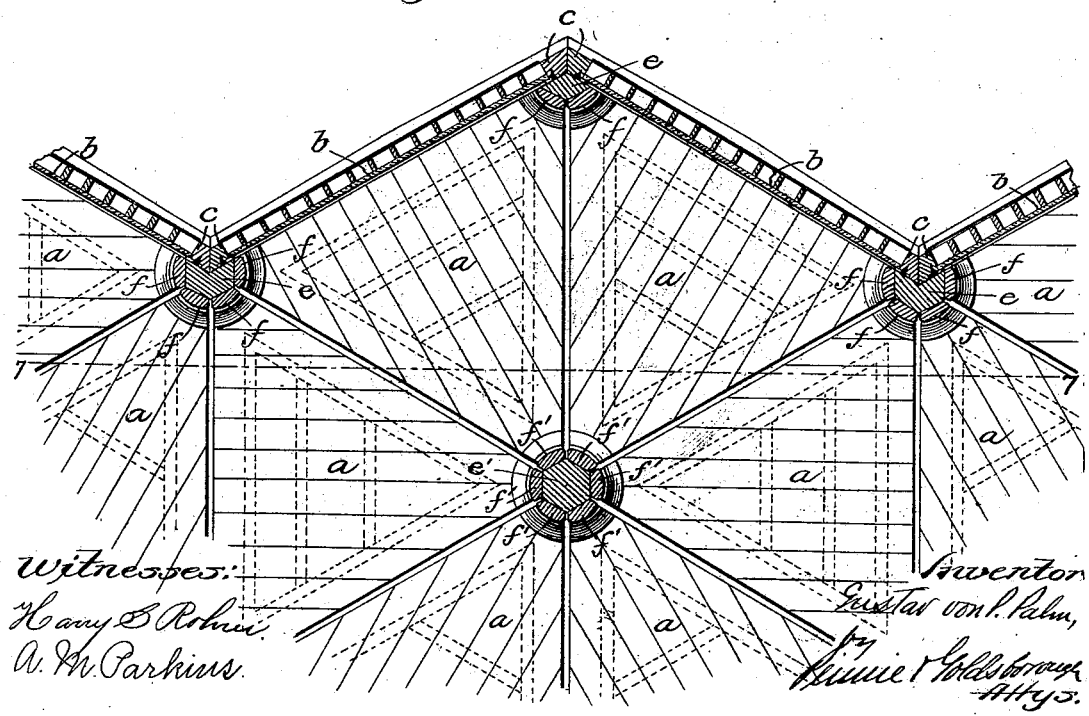
Figure 16:
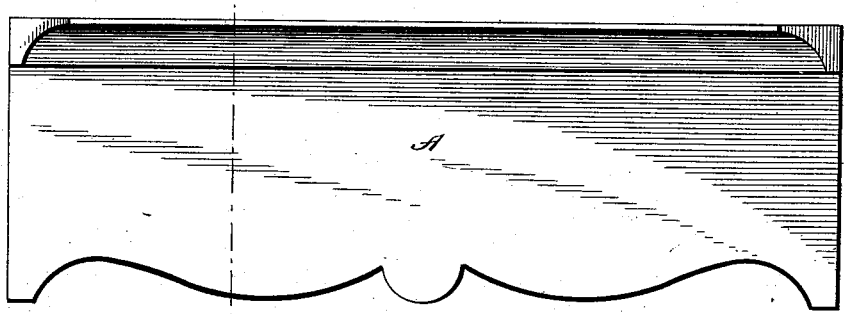
Figure 17:
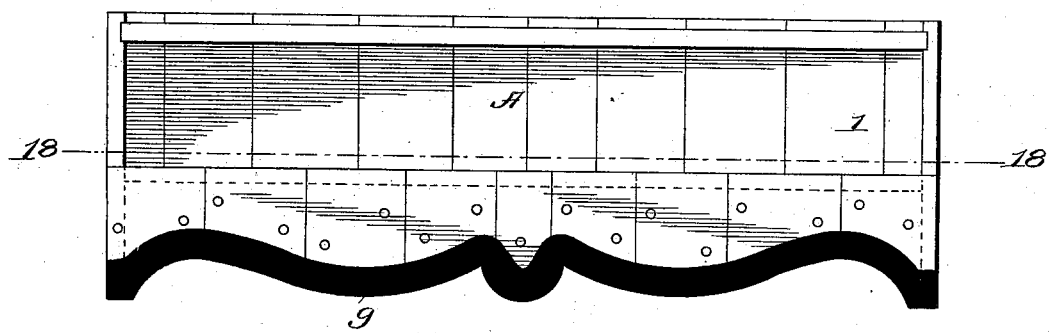
Figure 18:
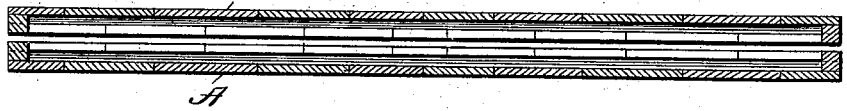
Figure 19:
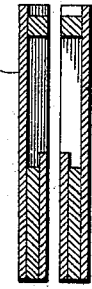

In the accompanying drawings, Figure 1 represents, in front elevation, my improved means for framing the maze mirrors. Fig. 2 represents a rear elevation thereof. Fig. 3 represents a vertical transverse section of the same. Fig. 4 represents two of said mirrors arranged at an angle to each other, the point of junction being concealed by a portion of a pillar or column, which by reflection in the mirror surfaces appears as a complete pillar or column. Figs. 5 and 6 represent on a larger scale the specific construction of said pillar or column. Fig. 7 represents in elevation and partial section a portion of the interior of my improved maze. Fig. 8 represents a plan view thereof partly in section. Figs. 9, 10 and 11 represent, respectively, a bottom plan view, top plan view, and edge view of one of the sections of flooring employed in connection with my improved maze. Figs. 12 and 13 represent, respectively a front and rear elevation of a form of arch frame which I sometimes employ instead of the columnar structure. Figs. 14 and 15 represent in partial plan and partial horizontal section, the employment of said arch frames in connection with one of the mirrors or arranged back to back to form an open arch. Figs. 16 and 17 represent, in front and rear elevation, a suitable form of arch for connecting the column shown in Figs. 7 and 8. Figs. 18 and 19 represent, respectively, sections taken on the lines 18—18 of Fig. 17 and 19—19 of Fig. 16, when two of the frames shown in said Fig. 16 are located back to back to span an open arch.

Similar letters of reference indicate similar parts throughout the several views.

The general plan of the maze with its tortuous passages is indicated in Figs. 7 and 8, and is to be substantially the same as shown and illustrated in my Patent No. 498,524, hereinbefore referred to, wherein the mirrors are arranged at angles to each other and at angles to the open arches which co-operate with them to produce the optical illusion.

In my preferred construction, and as illustrated in Fig. 8, the floor of the maze is made up of a number of equi-lateral and equi-angular triangles $a$. Close to one edge of each of these triangles is located a mirror $b$ contained within a frame. The vertical edges of the frame may be beveled as shown at $c$ in Figs. 2, 4 and 8, so as to make a bevel joint with each other, which joint is adapted to be concealed either by the columnar structure, shown in Figs. 4, 5, 6, 7 and 8, or by the beveled uprights $d$ shown in Figs. 12, 13 and 14.

Where the columnar structure is employed the same is made up by securing to the beveled edges $c$ $c$ of the mirror frame, a suitable support $e$ upon which are to be nailed or otherwise secured a series of vertical longitudinal strips $f$ whose outer peripheries are of general cylindrical contour and which are separated from each other by a space substantially the thickness of the glass of the mirror. The object of thus separating the vertical strips $f$ from each other is to deceive the observer into the belief that the reflection which he sees in the mirror of the edge of the strip proximate to the mirror is not a reflection, but is an actual space corresponding to the space left between the strips themselves. The observer thus receives the impression that the partial columns which he sees reflected in the glass are complete columns. To increase the delusion the proximate edges of the vertical strips are blackened as indicated in Fig. 5, thereby giving to said edges the same appearance that is presented in the mirror of the vertical edge of the strip facing said mirror. As indicated in Fig. 7 the columns are provided with suitable capitals and pedestals and are connected by an arch frame A, which may be of the construction shown in Figs. 16 to 19 inclusive, or of any other suitable ornamental configuration appropriate to the purpose.

At the angle facing each mirror is located a column $e'$ having strips $f'$ corresponding to the similar strips $f$ which are located proximate to the mirrors. The strips $f'$ are spaced apart and have their edges blackened in the same manner, and for the like purpose, as shown in Fig. 5, and the columns are provided with capitals and pedestals so as to present the same appearance as the partial columns proximate to the mirrors. From the partial column to the column facing each mirror extend arch frames of the same external appearance as the arch frame which spans the partial columns themselves. These arch frames extending to the complete columns are, however, in each instance two in number, arranged back to back, as indicated in Figs. 18 and 19, and along their lower edge they are blackened as indicated at $g$ in Fig. 17 so as to produce the same effect which is shown in Fig. 7, wherein is illustrated the reflection in the mirrors of the arch frames which are proximate to the mirrors. It will, of course, be understood that beneath the arch frames that are placed back to back as described, the space is open so that the observer may pass freely through said space. By reason of the fact that the double arch frames present the same appearance, in consequence of their blackened edges, as do the arch frames in front of the mirrors, he is uncertain as to which is the open space and which is the space closed by the mirrors, and this delusion is further heightened by spacing the triangular sections of flooring apart, as indicated in Fig. 8, and blackening the edges of said flooring as indicated in Fig. 11. The general effect upon the observer is, upon entering the maze, that he is within a passage-way or series of passage-ways spanned by arches and supported by columns. He is aware that some of the spaces beneath the arches are occupied by mirrors, but he is unable to distinguish the spaces that are thus occupied by mirrors from those that are freely opened. It is, of course, obvious, as contemplated in my former patent hereinbefore referred to, that instead of leaving the unmirrored spaces open a plate of transparent glass may occupy one or more of said spaces so as to increase the difficulty of threading the maze and to add to the deception of the person within the maze or to separate him entirely from access to certain portions of the maze or persons or other objects in said separated portions of the maze.

Instead of employing the columnar structure thus described, I may employ the more simple form of frame shown in Figs. 12 to 15 inclusive, in which case the uprights $d$ may be beveled at $e$ so as to make a close joint and the entire frame blackened along its inner border as indicated at $n$ in Figs. 13 and 15 so that when the frames are placed back to back to span a space not occupied by a mirror the blackened portion will be an imitation reflection that is observed in a mirror from the frame proximate thereto.

To prevent the mirrors, or the transparent glass, as the case may be, from being broken by collision therewith of persons who are deceived into walking against the mirror or glass, I provide means for permitting the glass to have a certain amount of flexure so as to yield to the shock of impact from the person colliding with it, but not sufficiently to cause its breakage. I have discovered that the desired result could be obtained by leaving the glass unconfined at its edges so that it may receive a flexure amounting in some cases to as much as a quarter of an inch. I provide the glass with a backing of such a character as to yield sufficiently to accommodate this flexure but to resist any further flexure, thereby preventing the glass being bent beyond the limits of safety. To this end, I locate the mirror or glass $b$ within the frame $c$ in such manner as to be unconfined at its edges, and provide a backing consisting of a series of strips $s$ spaced apart and fitting within grooves in the frame $c$ but with a capacity for a limited sliding movement in said grooves. Transversely across the series of strips $s$ is located a bar $t$ secured to the frame. Should a person collide with the mirror or glass $b$, said mirror or glass would bend until the motion was arrested by the limit placed upon it by the elasticity of the cross bar $t$. Practical experience with this arrangement has demonstrated that it is highly effectual as a preventive of breakage to the glass. The glass itself is held in place against falling forward by means of the metallic strips $r$, as shown.

It is apparent that the uniformity of the parts throughout the maze, and the general simplicity of the structure, render the device as a whole readily transportable and capable of being easily and quickly erected or taken down.

Having thus described my invention, what I claim is—

1. In a mirror maze, a columnar structure consisting of vertical strips or panels grouped about a center and having their edges separated from each other by an intervening space; substantially as described.

2. In a mirror maze, a columnar structure consisting of vertical strips or panels grouped about a center and having their edges separated from each other by an intervening space, said edges being blackened; substantially as described.

3. In a mirror maze, an arch having its upper portion formed of two arch-frames arranged back to back and separated by an intervening space; substantially as described.

4. In a mirror maze, an arch having its upper portion formed of two arch-frames arranged back to back and separated by an intervening space, the lower edges of the arch frames being blackened; substantially as described.

5. In a mirror maze, a flooring made up of triangular sections separated from each other by intervening spaces; substantially as described.

6. In a mirror maze, a flooring made up of triangular sections separated from each other by intervening spaces, the edges of said floor sections being blackened; substantially as described.

7. In a mirror maze, the combination of mirror frames beveled at their edges so as to fit together, and columnar structures at the point of meeting to conceal the joint and to be reflected in the mirrors; substantially as described.

8. In a mirror maze, the combination with a mirror and an arch frame proximate to the face of the mirror so that its edges are reflected therein, of two arch frames arranged back to back at an angle to said mirror and separated by an intervening space, the flooring beneath the two arches being likewise separated by an intervening space; substantially as described.

9. The combination of a glass unconfined at its edges so as to be capable of flexure, and a frame within which said glass is mounted, said frame having a yielding backing for the glass; substantially as described.

10. The combination of a glass unconfined at its edges, a frame within which said glass is mounted, and a backing consisting of strips spaced apart and a cross-bar; substantially as described.

In testimony whereof I affix my signature in presence of two witnesses.

GUSTAV VON PRITTWITZ PALM.

Witnesses:
WM. CARTER,
F. J. MOORE.